(12) United States Patent
Liu

(10) Patent No.: US 8,674,612 B2
(45) Date of Patent: Mar. 18, 2014

(54) FLUORESCENT TUBE DRIVING DEVICE

(75) Inventor: Zhen-Chun Liu, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 145 days.

(21) Appl. No.: 13/459,252

(22) Filed: Apr. 30, 2012

(65) Prior Publication Data

US 2012/0319606 A1 Dec. 20, 2012

(30) Foreign Application Priority Data

Jun. 16, 2011 (TW) .............................. 100121048 A

(51) Int. Cl.
*H05B 37/00* (2006.01)

(52) U.S. Cl.
USPC ........................................................ 315/205

(58) Field of Classification Search
USPC ...................... 315/205, 209 R, 224, 119, 127
See application file for complete search history.

(56) References Cited

U.S. PATENT DOCUMENTS

| 3,754,160 | A | * | 8/1973 | Jensen ............................ 315/97 |
| 5,416,387 | A | * | 5/1995 | Cuk et al. .................. 315/209 R |
| 5,691,605 | A | * | 11/1997 | Xia et al. ...................... 315/307 |
| 5,872,429 | A | * | 2/1999 | Xia et al. ...................... 315/194 |
| 6,020,689 | A | * | 2/2000 | Gradzki et al. ............... 315/224 |
| 8,018,173 | B2 | * | 9/2011 | Shackle et al. ............ 315/209 R |
| 2008/0054816 | A1 | * | 3/2008 | Shackle et al. ............ 315/209 R |

* cited by examiner

*Primary Examiner* — Thienvu Tran
(74) *Attorney, Agent, or Firm* — Winston Hsu; Scott Margo

(57) ABSTRACT

A fluorescent tube driving device including a first voltage converter, a second voltage converter, an oscillating unit, an inverter, an adjusting unit, a switching unit and a voltage stabilizing unit is provided. The first and the second voltage converters convert an alternating-current (AC) voltage to a first direct-current (DC) voltage and a second DC voltage. The oscillating unit is charged by the first DC voltage to generate a charging voltage and a trigger signal. The adjusting unit is charged by the charging voltage to generate a power supply signal. The switching unit transmits the second DC voltage according to the power supply signal. The voltage stabilizing unit stabilizes the voltage from the switching unit. Both of the oscillating unit and the adjusting unit are charged at a delay speed to synchronously transmit the operation voltage and the trigger signal to a controller in the inverter.

17 Claims, 3 Drawing Sheets

FLUORESCENT TUBE DRIVING DEVICE

CROSS-REFERENCE TO RELATED APPLICATION

This application claims the priority benefit of Taiwan application serial no. 100121048, filed on Jun. 16, 2011. The entirety of the above-mentioned patent application is hereby incorporated by reference herein and made a part of this specification.

BACKGROUND OF THE INVENTION

1. Field of the Invention

The present invention generally relates to a driving device, in particular, to a fluorescent tube driving device.

2. Description of Related Art

A fluorescent tube has advantages of having a low operation temperature, a high light emitting efficiency, a long operating life, and various colors, so as to be widely applied to current illumination devices. An inverter is a core circuit driving the fluorescent tube, and common circuit architecture includes a push-pull inverter, a full-bridge inverter, and a half-bridge inverter etc. The half-bridge inverter has advantages of having simple architecture and a low cost, so that a fluorescent tube driving device mostly adopts circuit architecture being mainly the half-bridge inverter.

The half-bridge inverter achieves a high voltage and current stabilizing effect required during lighting in a resonant manner, and includes a controller, an on-off unit, and a resonant slot. During operation, the controller generates a corresponding pulse width modulation signal according to whether the fluorescent tube is lighted up, so as to control a conduction state of the on-off unit. In addition, the on-off unit may receive a DC voltage, and with switching of the conduction state of the on-off unit, an electrical power transmitted to the resonant slot by the DC voltage may be controlled. Therefore, the resonant slot generates a corresponding driving voltage, so as to drive the fluorescent tube.

However, during actual application, when a system supplies power to the controller at the first time, the controller may not light up the fluorescent tube at first time, so that electronic elements in the device may be overheating or burnt. Therefore, it is a topic to be solved in the design of the fluorescent tube driving device how to ensure that the controller may light up the fluorescent tube at first time.

SUMMARY OF THE INVENTION

Accordingly, the present invention is directed to a fluorescent tube driving device, capable of synchronously transmitting an operation voltage and a trigger signal to a controller in an inverter, so that the inverter may light up the fluorescent tube at first time, thereby preventing a situation that elements are overheating or even burnt when lighting is unsuccessful.

The present invention provides a fluorescent tube driving device, which includes a first voltage converter, a second voltage converter, an oscillating unit, an inverter, an adjusting unit, a switching unit, and a voltage stabilizing unit. The first voltage converter receives an alternating-current (AC) voltage, and converts the AC voltage to a first direct-current (DC) voltage. The second voltage converter receives the AC voltage, and converts the AC voltage to a second DC voltage. The oscillating unit is charged by the first DC voltage to generate a charging voltage and a trigger signal. The inverter is used to light up the fluorescent tube, and includes a controller. The controller is operated under an operation voltage, and is enabled according to the trigger signal. The adjusting unit is charged by the charging voltage to generate a power supply signal. The switching unit receives the second DC voltage, and transmits the second DC voltage according to the power supply signal. The voltage stabilizing unit stabilizes the second DC voltage to the operation voltage. Both the oscillating unit and the adjusting unit are charged at a delay speed to synchronously transmit the operation voltage and the trigger signal to the controller.

In an embodiment of the present invention, the oscillating unit is electrically connected to the inverter through a control end, and after the controller starts operation, the inverter pulls down a level of the control end to a ground voltage, so that the oscillating unit stops generating the charging voltage and the trigger signal.

In an embodiment of the present invention, the adjusting unit is further charged by the operation voltage, so as to continuously generate the power supply signal when the oscillating unit stops generating the charging voltage.

In an embodiment of the present invention, the driving device for the fluorescent tube further includes an auxiliary voltage generator. The auxiliary voltage generator generates an auxiliary voltage in response to a resonant slot in the inverter, and the switching unit further receives the auxiliary voltage, and transmits the auxiliary voltage according to the power supply signal.

Based on the above mentioned, an oscillating unit and an adjusting unit of the present invention are charged at the same delay speed, so that a controller in an inverter may synchronously receive an operation voltage and a trigger signal. Therefore, the inverter may light up a fluorescent tube at first time, so as to prevent a situation that elements are overheating or even burnt when lighting is unsuccessful.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
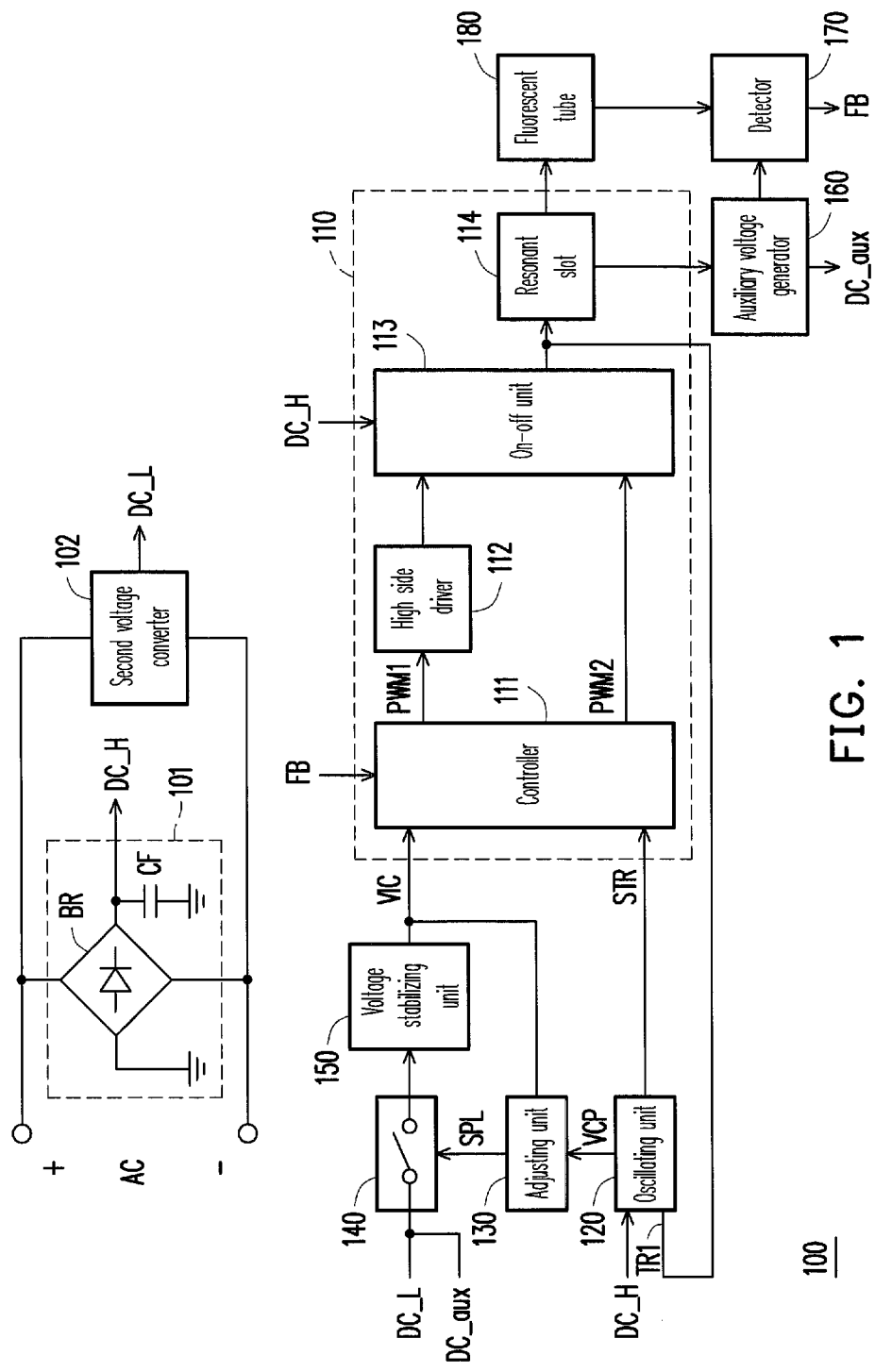
FIG. 1 is a schematic block diagram of a driving device for a fluorescent tube according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic block diagram of a driving device for a fluorescent tube according to an embodiment of the present invention. Referring to FIG. 1, the driving device 100 is used to drive a fluorescent tube 180, and includes a first voltage converter 101, a second voltage converter 102, an inverter 110, an oscillating unit 120, an adjusting unit 130, a switching unit 140, a voltage stabilizing unit 150, an auxiliary voltage generator 160, and a detector 170. The fluorescent tube 180 may be, for example, a cold cathode fluorescent tube, or a hot-cathode fluorescent tube of another specification, for example, T3, T5.

The first voltage converter 101 and the second voltage converter 102 receive an AC voltage AC, and convert the AC voltage AC to a first DC voltage DC_H and a second DC voltage DC_L, in which the first DC voltage DC_H is greater than the second DC voltage DC_L. Further, the first voltage converter 101 includes a bridge rectifier BR and a filter capacitor CF. Here, the bridge rectifier BR is used to receive the AC voltage AC, and rectify the AC voltage AC, so as to provide the first DC voltage DC_H. In addition, the filter capacitor CF is electrically connected to the bridge rectifier BR, and filters the first DC voltage DC_H provided by the bridge rectifier BR, so as to lower a ripple factor of the first DC voltage DC_H.

The inverter 110 receives the first DC voltage DC_H, and converts the first DC voltage DC_H to an AC driving voltage, so as to light up the fluorescent tube 180. For a detailed structure of the inverter 110, the inverter 110 includes a controller 111, a high side driver 112, an on-off unit 113, and a resonant slot 114. The controller 111 is operated under an operation voltage VIC, and is enabled according to a trigger signal STR. In addition, when the controller 111 is operated, the controller 111 may generate a first pulse width modulation signal PWM1 and a second pulse width modulation signal PWM2. Further, the high side driver 112 is used to adjust a level of the first pulse width modulation signal PWM1, so as to satisfy an operation level required by a high voltage switch.

In another aspect, the on-off unit 113 receives the first DC voltage DC_H, and is controlled by the second pulse width modulation signal PWM2 and the adjusted first pulse width modulation signal PWM1. In addition, with switching of a conduction state of the on-off unit 113, a power transmitted to the resonant slot 114 by the first DC voltage DC_H may be controlled. Therefore, the resonant slot 114 generates the corresponding AC driving voltage, so as to light up the fluorescent tube 180. In addition, in order to improve illumination quality of the fluorescent tube 180, the detector 170 is used to detect the fluorescent tube 180, and generate a feed-back signal FB according to a detection result. Therefore, the controller 111 may adjust duty cycles or frequencies of the first pulse width modulation signal PWM1 and the second pulse width modulation signal PWM2 according to the feed-back signal FB.

It should be noted that the driving device 100 for the fluorescent tube may synchronously transmit the operation voltage VIC and the trigger signal STR to the controller 111 in the inverter 110, so as to ensure that the inverter 110 may light up the fluorescent tube 180 at first time. In this manner, a situation that elements are overheating or even burnt when lighting is unsuccessful is prevented, so as to increase a operating life of the driving device 100 for the fluorescent tube. Detailed actuation that the driving device 100 synchronously transmits the operation voltage VIC and the trigger signal STR to controller 111 is described in the following.

Referring to FIG. 1, the oscillating unit 120 is charged by the first DC voltage DC_H to generate a charging voltage VCP and the trigger signal STR. In addition, the adjusting unit 130 is charged by the charging voltage VCP to generate a power supply signal SPL. Further, the switching unit 140 receives the second DC voltage DC_L, and transmits the second DC voltage DC_L to the voltage stabilizing unit 150 according to the power supply signal SPL. Therefore, the voltage stabilizing unit 150 stabilizes the second DC voltage DC_L to the operation voltage VIC required by the controller 111.

It should be noted that the oscillating unit 120 and the adjusting unit 130 are changed at the same delay speed to synchronously transmit the operation voltage VIC and the trigger signal STR to the controller 111. Here, the controller 111 starts to operate according to the operation voltage VIC and the trigger signal STR, so that the inverter 110 lights up the fluorescent tube 180. In addition, the oscillating unit 120 is further electrically connected to the on-off unit 113 in the inverter 110 through a control end TR1. Therefore, after the controller 111 starts operation, in addition to lighting up the fluorescent tube 180, the inverter 110 pulls down a level of the control end TR1 of the oscillating unit 120 to a ground voltage, so that the oscillating unit 120 stops generating the charging voltage VCP and the trigger signal STR.

In another aspect, the operation voltage VIC is further transmitted to the adjusting unit 130, so that when the oscillating unit 120 stops generating the charging voltage VCP, the adjusting unit 130 may be charged by the operation voltage VIC to continuously generate the power supply signal SPL to the switching unit 140. In this manner, the voltage stabilizing unit 150 may continuously receive the voltage from the switching unit 140, so as to continuously generate the operation voltage VIC required by the controller 111. In other words, after the fluorescent tube 180 is lighted up at first time, the oscillating unit 120 stops generating the charging voltage VCP and the trigger signal STR. When the trigger signal STR is stopped from being generated, the first pulse width modulation signal PWM1 and the second pulse width modulation signal PWM2 are continuously generated by the feed-back signal FB, so as to control the voltage stabilizing unit 150 to continuously generate the operation voltage VIC required by the controller 111.

In order to improve operation performances of the driving device 100 for the fluorescent tube, the driving device 100 for the fluorescent tube may generate an auxiliary voltage DC_aux through the auxiliary voltage generator 160, and transmits the auxiliary voltage DC_aux to the switching unit 140. Therefore, the voltage stabilizing unit 150 may generate the operation voltage VIC required by the controller 111 by the auxiliary voltage DC_aux. The auxiliary voltage generator 160 accordingly generates the auxiliary voltage DC_aux in response to the resonant slot 114 in the inverter 110.

Figure 2:
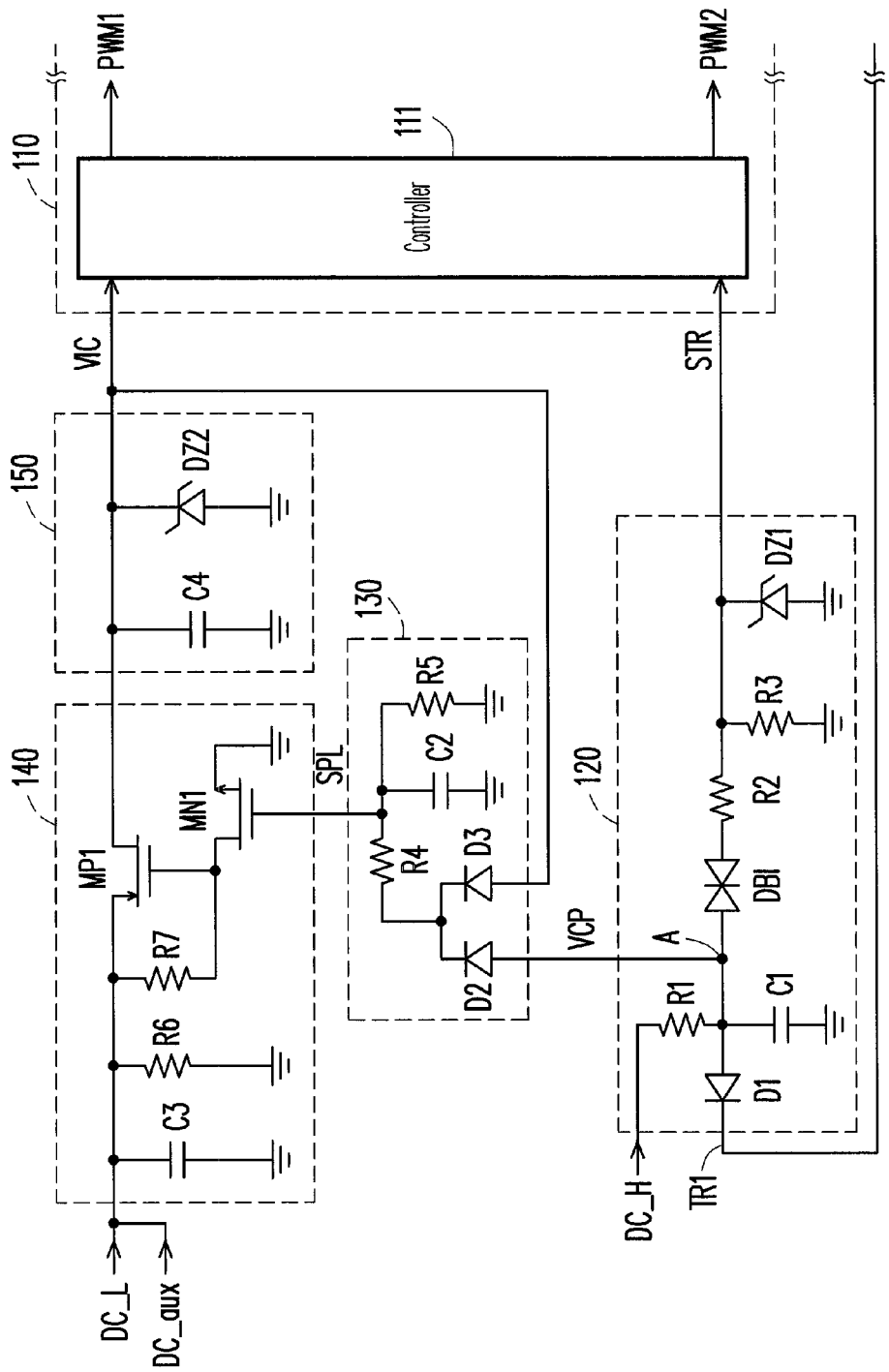
FIG. 2 is a partial circuit diagram of a driving device for a fluorescent tube according to an embodiment of the present invention.

In order to enable persons of ordinary skill in the art to understand the present invention, FIG. 2 is a partial circuit diagram of a driving device for a fluorescent tube according to an embodiment of the present invention. Referring to FIG. 2, circuit architecture of the oscillating unit 120, the adjusting unit 130, the switching unit 140, and the voltage stabilizing unit 150 is shown.

Referring to FIG. 2, the oscillating unit 120 includes resistors R1-R3, a capacitor C1, a diode D1, a bilateral diode DBI, and a Zener diode DZ1. A first end of the resistor R1 receives the first DC voltage DC_H, and a second end of the resistor R1 is used to provide the charging voltage VCP. A first end of the capacitor C1 is electrically connected to the second end of the resistor R1, and a second end of the capacitor C1 is electrically connected to a ground end.

Further, an anode of the diode D1 is electrically connected to the second end of the resistor R1, and a cathode of the diode D1 is electrically connected to the control end TR1 of the oscillating unit 120. A first anode of the bilateral diode DBI is electrically connected to the second end of the resistor R1. A first end of the resistor R2 is electrically connected to a second anode of the bilateral diode DBI, and a second end of the resistor R2 is used to provide the trigger signal STR. A first end of the resistor R3 is electrically connected to the second end of the resistor R2, and a second end of the resistor R3 is electrically connected to the ground end. A cathode of the Zener diode DZ1 is electrically connected to the second end of the resistor R2, and an anode of the Zener diode DZ1 is electrically connected to the ground end.

During operation, at the beginning, the inverter 110 does not start operation, so that the diode D1 is in a non-conducted state. Here, the first DC voltage DC_H may charge the capacitor C1 through the resistor R1, so as to generate the charging voltage VCP. The delay speed of the oscillating unit 120 depends on delay time formed by the resistor R1 and the capacitor C1. In addition, when the charging voltage VCP is greater than a critical voltage of the bilateral diode DBI, the bilateral diode DBI is conducted. Here, a voltage adjusting circuit formed by the resistors R2, R3 and the Zener diode DZ1 generates the trigger signal STR. In another aspect, when the inverter 110 starts operation in response to starting of the controller 111, the level of the control end TR1 of the oscillating unit 120 is pulled down to the ground voltage. Here, the diode D1 is in the conducted state, so that a level of a node A is near the ground voltage. In this manner, the oscillating unit 120 stops generating the charging voltage VCP and the trigger signal STR.

The adjusting unit 130 includes diodes D2-D3, resistors R4-R5, and a capacitor C2. An anode of the diode D2 is used to receive the charging voltage VCP. An anode of the diode D3 is used to receive the operation voltage VIC, and a cathode of the diode D3 is electrically connected to a cathode of the diode D2. A first end of the resistor R4 is electrically connected to the cathode of the diode D2, and a second end of the resistor R4 is used to supply the power supply signal SPL. A first end of the capacitor C2 is electrically connected to the second end of the resistor R4, and a second end of the capacitor C2 is electrically connected to the ground end. A first end of the resistor R5 is electrically connected to the second end of the resistor R4, and a second end of the resistor R5 is electrically connected to the ground end.

During operation, at the beginning, the operation voltage VIC is not generated, so that the adjusting unit 130 only receives the charging voltage VCP from the oscillating unit 120. Here, two ends of the diode D2 are conducted according to the charging voltage VCP, so that the charging voltage VCP may charge the capacitor C2 through the resistor R4. In this manner, the adjusting unit 130 accordingly generates the power supply signal SPL. The delay speed of the adjusting unit 130 depends on the delay time formed by the resistor R4 and the capacitor C2. Further, when the operation voltage VIC is generated, the operation voltage VIC is transmitted back to the diode D3. Therefore, when the oscillating unit 120 stops generating the charging voltage VCP, the operation voltage VIC transmitted back conducts two ends of the diode D3, so as to charge the capacitor C2 through the resistor R4. In this manner, even the oscillating unit 120 stops generating the charging voltage VCP, the adjusting unit 130 may still continuously generate the power supply signal SPL.

The switching unit 140 includes a capacitor C3, a P-type transistor MP1, a resistor R6, a resistor R7, and an N-type transistor MN1. A first end of the capacitor C3 receives the second DC voltage DC_L and the auxiliary voltage DC_aux, and a second end of the capacitor C3 is electrically connected to the ground end. A first end of the resistor R6 is electrically connected to the first end of the capacitor C3, so as to receive the second DC voltage DC_L and the auxiliary voltage DC_aux, and a second end of the resistor R6 is electrically connected to the ground end. The resistor R6 is used to prevent the voltage flowing through the capacitor C3 from generating excessively large voltage drift. A source of the P-type transistor MP1 receives the second DC voltage DC_L, and a drain of the P-type transistor MP1 is electrically connected to the voltage stabilizing unit 150. A first end of the resistor R7 is electrically connected to the source of the P-type transistor MP1, and a second end of the resistor R7 is electrically connected to a gate of the P-type transistor MP1. A drain of the N-type transistor MN1 is electrically connected to the gate of the P-type transistor MP1, a gate of the N-type transistor MN1 receives the power supply signal SPL, and a source of the N-type transistor MN1 is electrically connected to the ground end.

During operation, the N-type transistor MN1 is conducted according to the power supply signal SPL, so that a level of the gate of the P-type transistor MP1 is pulled down to the ground voltage. Here, the P-type transistor MP1 is also conducted, so that the second DC voltage DC_L and/or the auxiliary voltage DC_aux is transmitted to the voltage stabilizing unit 150. The capacitor C3 and the resistor R7 are used to adjust a conduction speed of the P-type transistor MP1.

The voltage stabilizing unit 150 includes a capacitor C4 and a Zener diode DZ2. A first end of the capacitor C4 is used to receive the voltage from the switching unit 140, and a second end of the capacitor C4 is electrically connected to the ground end. A cathode of the Zener diode DZ2 is electrically connected to the first end of the capacitor C4, and an anode of the Zener diode DZ2 is electrically connected to the ground end. During operation, the voltage from the switching unit 140 may charge the capacitor C4, and the voltage dropped on the capacitor C4 may be stabilized to the operation voltage VIC through the Zener diode DZ2.

Figure 3:
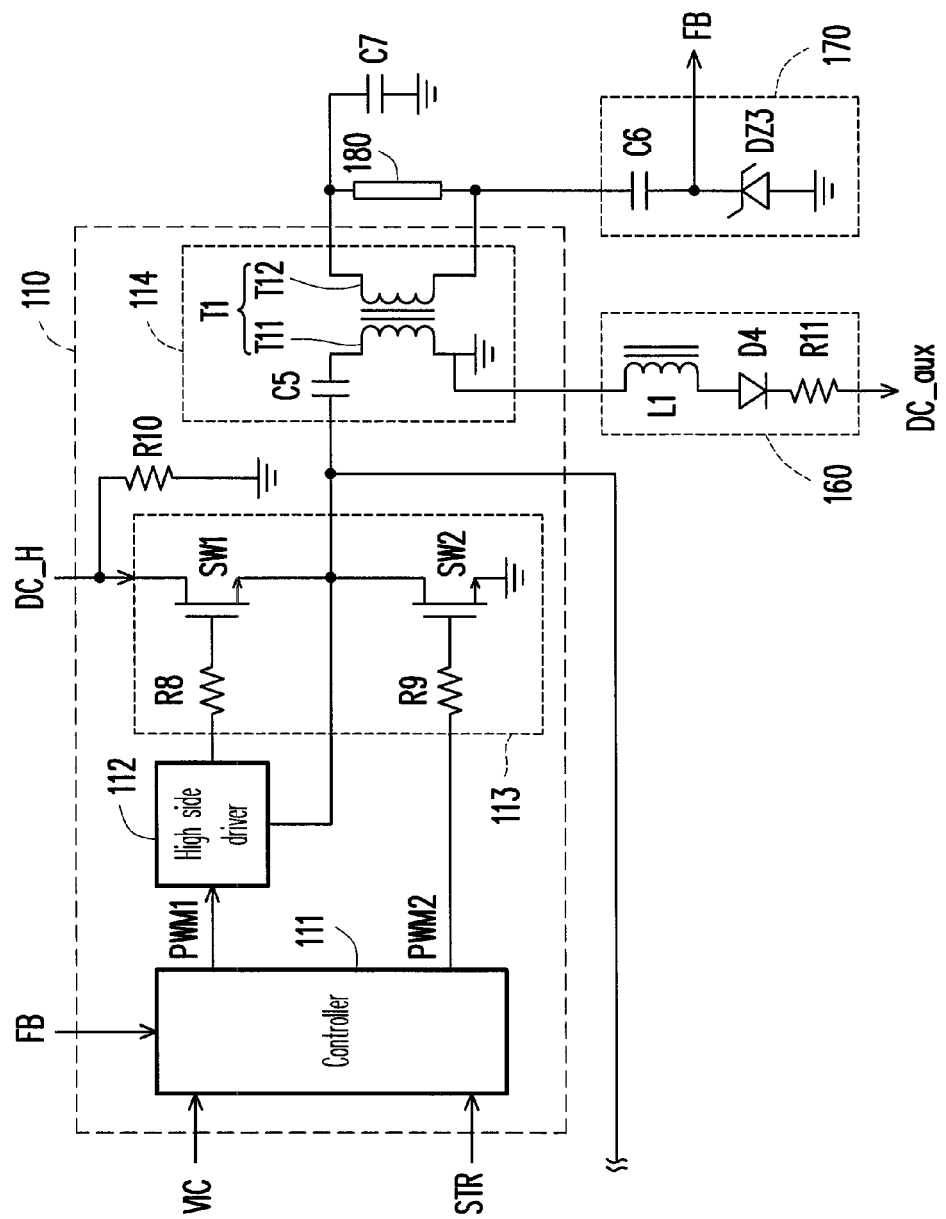
FIG. 3 is another partial circuit diagram of a driving device for a fluorescent tube according to an embodiment of the present invention.

FIG. 3 is another partial circuit diagram of a driving device for a fluorescent tube according to an embodiment of the present invention. Referring to FIG. 3, circuit architecture of the on-off unit 113, the resonant slot 114, the auxiliary voltage generator 160, and the detector 170 is shown. Referring to FIG. 3, the on-off unit 113 includes resistors R8-R9 and switches SW1-SW2, the resonant slot 114 includes a capacitor C5 and a transformer T1, and the inverter 110 further includes a resistor R10.

In entire architecture, a first end of the resistor R8 receives the adjusted first pulse width modulation signal PWM1, and a first end of the resistor R9 receives the second pulse width modulation signal PWM2. A first end of the switch SW1 receives the first DC voltage DC_H, a control end of the switch SW1 is electrically connected to a second end of the resistor R8, and a second end of the switch SW1 is electrically connected to the resonant slot 114. A first end of the resistor R10 is electrically connected to the on-off unit 113, and receives the first DC voltage DC_H, and a second end of the resistor R10 is electrically connected to the ground end. When a power source is turned off or a system is restarted because of fail of normal starting, the first DC voltage DC_H may be discharged to ground through the resistor R10, so as to prevent a situation that the operation voltage VIC and the trigger signal STR cannot be synchronous in the system. A first end of the switch SW2 is electrically connected to the second end of the switch SW1, a control end of the switch SW2 is electrically connected to a second end of the resistor R9, and a second end of the switch SW2 is electrically connected to the ground end. Further, a first end of the capacitor C5 is electrically connected to the on-off unit 113. The transformer T1 has a primary side T11 and a secondary side T12, in which the primary side T11 is electrically connected between a second end of the capacitor C5 and the ground end, and the secondary side T12 and the fluorescent tube 180 are connected in parallel with each other. In addition, the fluorescent tube 180 is further electrically connected to the ground end through the capacitor C7.

During operation, the switch SW1 receives the adjusted first pulse width modulation signal PWM1 through the resistor R8, and the switch SW2 receives second pulse width modulation signal PWM2 through the resistor R9. In addition, the switch SW1 and the switch SW2 may adjust the conduction state thereof according to the adjusted first pulse width modulation signal PWM1 and the second pulse width modulation signal PWM2, so as to control the power transmitted to the resonant slot 114 by the first DC voltage DC_H. In addition, the resonant slot 114 may perform boosting and filtering operations through the capacitor C5 and the transformer T1, so as to generate the AC driving voltage to light up the fluorescent tube 180.

Referring to FIG. 3, the auxiliary voltage generator 160 includes an inductor L1, a diode D4, and a resistor R11. The inductor L1 induces a current of the primary side T11 of the transformer T1, and accordingly generates an inducing current. In addition, an anode of the diode D4 receives the inducing current, and transmits the inducing current to a first end of the resistor R11. Therefore, the auxiliary voltage generator 160 may generate the corresponding auxiliary voltage DC_aux through a second end of the resistor R11. Further, the detector 170 includes a capacitor C6 and a Zener diode DZ3. A first end of the capacitor C6 is electrically connected to the fluorescent tube 180. A cathode of the Zener diode DZ3 is electrically connected to a second end of the capacitor C6, and an anode of the Zener diode DZ3 is electrically connected to the ground end. During operation, the Zener diode DZ3 is used to limit a voltage level of the second end of the capacitor C6. In addition, the capacitor C6 may receive the voltage from the fluorescent tube 180, so as to generate the corresponding feed-back signal FB.

To sum up, an oscillating unit and an adjusting unit of the present invention are charged at the same delay speed, so that a controller in an inverter may synchronously receive an operation voltage and a trigger signal. Therefore, the inverter may light up a fluorescent tube at first time, so as to prevent a situation that elements are overheating or even burnt when lighting is unsuccessful, and increase an operating life of a driving device for the fluorescent tube.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fluorescent tube driving device, comprising:
    a fluorescent tube;
    a first voltage converter, receiving an alternating-current (AC) voltage, and converting the AC voltage to a first direct-current (DC) voltage;
    a second voltage converter, receiving the AC voltage, and converting the AC voltage to a second DC voltage;
    an oscillating unit, charged by the first DC voltage to generate a charging voltage and a trigger signal;
    an inverter, coupled to the fluorescent tube and used to light up the fluorescent tube, and comprising a controller, wherein the controller is operated under an operation voltage, and is enabled according to the trigger signal;
    an adjusting unit, charged by the charging voltage to generate a power supply signal;
    a switching unit, receiving the second DC voltage, and transmitting the second DC voltage according to the power supply signal; and
    a voltage stabilizing unit, stabilizing the second DC voltage to the operation voltage,
    wherein both the oscillating unit and the adjusting unit are charged at a delay speed to synchronously transmit the operation voltage and the trigger signal to the controller.

2. The fluorescent tube driving device according to claim 1, wherein the oscillating unit is electrically connected to the inverter through a control end, and after the controller starts operation, the inverter pulls down a level of the control end to a ground voltage, so that the oscillating unit stops generating the charging voltage and the trigger signal.

3. The fluorescent tube driving device according to claim 2, wherein the adjusting unit is further charged by the operation voltage, so as to continuously generate the power supply signal when the oscillating unit stops generating the charging voltage.

4. The fluorescent tube driving device according to claim 2, wherein the oscillating unit comprises:
    a first resistor, wherein a first end of the first resistor receives the first DC voltage, and a second end of the first resistor provides the charging voltage;
    a first capacitor, wherein a first end of the first capacitor is electrically connected to the second end of the first resistor, and a second end of the first capacitor is electrically connected to a ground end, wherein the delay speed of the oscillating unit depends on a delay time formed by the first resistor and the first capacitor;
    a first diode, wherein an anode of the first diode is electrically connected to the second end of the first resistor, and a cathode of the first diode is electrically connected to the control end;
    a bilateral diode, wherein a first anode of the bilateral diode is electrically connected to the second end of the first resistor;
    a second resistor, wherein a first end of the second resistor is electrically connected to a second anode of the bilateral diode, and a second end of the second resistor provides the trigger signal;
    a third resistor, wherein a first end of the third resistor is electrically connected to the second end of the second resistor, and a second end of the third resistor is electrically connected to the ground end; and
    a first Zener diode, wherein a cathode of the first Zener diode is electrically connected to the second end of the second resistor, and an anode of the first Zener diode is electrically connected to the ground end.

5. The fluorescent tube driving device according to claim 1, wherein the adjusting unit comprises:
    a second diode, wherein an anode of the second diode receives the charging voltage;
    a third diode, wherein an anode of the third diode receives the operation voltage, and a cathode of the third diode is electrically connected to a cathode of the second diode;
    a fourth resistor, wherein a first end of the fourth resistor is electrically connected to the cathode of the second diode, and a second end of the fourth resistor provides the power supply signal;
    a second capacitor, wherein a first end of the second capacitor is electrically connected to the second end of the fourth resistor, and a second end of the second capacitor is electrically connected to a ground end; and
    a fifth resistor, wherein a first end of the fifth resistor is electrically connected to the second end of the fourth resistor, and a second end of the fifth resistor is electrically connected to the ground end,
wherein the delay speed of the adjusting unit depends on a delay time formed by the fourth resistor and the second capacitor.

6. The fluorescent tube driving device according to claim 1, wherein the switching unit comprises:
   a third capacitor, wherein a first end of the third capacitor receives the second DC voltage, and a second end of the third capacitor is electrically connected to a ground end;
   a sixth resistor, wherein a first end of the sixth resistor receives the second DC voltage, and a second end of the sixth resistor is electrically connected to the ground end;
   a P-type transistor, wherein a source of the P-type transistor receives the second DC voltage, and a drain of the P-type transistor is electrically connected to the voltage stabilizing unit;
   a seventh resistor, wherein a first end of the seventh resistor is electrically connected to the source of the P-type transistor, and a second end of the seventh resistor is electrically connected to a gate of the P-type transistor; and
   an N-type transistor, wherein a drain of the N-type transistor is electrically connected to the gate of the P-type transistor, a gate of the N-type transistor receives the power supply signal, and a source of the N-type transistor is electrically connected to the ground end, wherein the N-type transistor is conducted according to the power supply signal.

7. The fluorescent tube driving device according to claim 1, wherein the voltage stabilizing unit comprises:
   a fourth capacitor, wherein a first end of the fourth capacitor receives the second DC voltage from the switching unit, and a second end of the fourth capacitor is electrically connected to a ground end; and
   a second Zener diode, wherein a cathode of the second Zener diode is electrically connected to the first end of the fourth capacitor, and an anode of the second Zener diode is electrically connected to the ground end.

8. The fluorescent tube driving device according to claim 1, wherein the controller generates a first pulse width modulation signal and a second pulse width modulation signal, and the inverter further comprises:
   a high side driver, adjusting a level of the first pulse width modulation signal;
   an on-off unit, receiving the first DC voltage, and controlled by the second pulse width modulation signal and the adjusted first pulse width modulation signal; and
   a resonant slot, electrically connected to the on-off unit, and generates a driving voltage, so as to light up the fluorescent tube.

9. The fluorescent tube driving device according to claim 8, wherein the on-off unit comprises:
   an eighth resistor, wherein a first end of the eighth resistor receives the adjusted first pulse width modulation signal;
   a ninth resistor, wherein a first end of the ninth resistor receives the second pulse width modulation signal;
   a first switch, wherein a first end of the first switch receives the first DC voltage, a control end of the first switch is electrically connected to a second end of the eighth resistor, and a second end of the first switch is electrically connected to the resonant slot; and
   a second switch, wherein a first end of the second switch is electrically connected to the second end of the first switch, a control end of the second switch is electrically connected to a second end of the ninth resistor, and a second end of the second switch is electrically connected to a ground end.

10. The fluorescent tube driving device according to claim 8, wherein the resonant slot comprises:
    a fifth capacitor, wherein a first end of the fifth capacitor is electrically connected to the on-off unit; and
    a transformer, comprising a primary side and a secondary side, wherein the primary side is electrically connected between a second end of the fifth capacitor and a ground end, and the secondary side and the fluorescent tube are connected in parallel with each other.

11. The fluorescent tube driving device according to claim 8, wherein the inverter further comprises:
    a tenth resistor, receiving the first DC voltage, and electrically connected between the on-off unit and the ground end.

12. The fluorescent tube driving device according to claim 1, further comprising:
    an auxiliary voltage generator, generating an auxiliary voltage in response to a resonant slot in the inverter, wherein the switching unit further receives the auxiliary voltage, and transmits the auxiliary voltage according to the power supply signal.

13. The fluorescent tube driving device according to claim 12, wherein the auxiliary voltage generator comprises:
    an inductor, inducing a current in the resonant slot, and accordingly generating an inducing current;
    a fourth diode, wherein an anode of the fourth diode receives the inducing current; and
    an eleventh resistor, wherein a first end of the eleventh resistor is electrically connected to a cathode of the fourth diode, and a second end of the eleventh resistor generates the auxiliary voltage.

14. The fluorescent tube driving device according to claim 1, further comprising:
    a detector, detecting the fluorescent tube, and generating a feed-back signal according to a detection result,
    wherein the controller adjusts a first pulse width modulation signal and a second pulse width modulation signal according to the feed-back signal.

15. The fluorescent tube driving device according to claim 14, wherein the detector comprises:
    a sixth capacitor, wherein a first end of the sixth capacitor is electrically connected to the fluorescent tube, and a second end of the sixth capacitor provides the feed-back signal; and
    a third Zener diode, wherein a cathode of the third Zener diode is electrically connected to the second end of the sixth capacitor, and an anode of the third Zener diode is electrically connected to a ground end.

16. The fluorescent tube driving device according to claim 1, wherein the first voltage converter comprises:
    a bridge rectifier, receiving the AC voltage, and rectifying the AC voltage, so as to provide the first DC voltage; and
    a filter capacitor, electrically connected to the bridge rectifier, and filtering the first DC voltage provided by the bridge rectifier.

17. The fluorescent tube driving device according to claim 1, wherein the fluorescent tube is a cold cathode fluorescent tube or a hot-cathode fluorescent tube.

* * * * *